United States Patent [19]

Arai

[11] Patent Number: 5,606,388
[45] Date of Patent: Feb. 25, 1997

[54] PHOTO FILM CASSETTE FOR LENS-FITTED PHOTO FILM UNIT AND CASSETTE MARKING METHOD

[75] Inventor: Takuya Arai, Tokyo, Japan

[73] Assignee: Fuji Photo Film Co., Ltd., Kanagawa, Japan

[21] Appl. No.: 336,194

[22] Filed: Nov. 2, 1994

[30] Foreign Application Priority Data

Nov. 5, 1993 [JP] Japan .................................. 5-277123

[51] Int. Cl.$^6$ .................................................. G03B 17/26
[52] U.S. Cl. .................................................. 396/512
[58] Field of Search .................................. 354/275, 288

[56] References Cited

U.S. PATENT DOCUMENTS 3,911,818  10/1975  MacIlvaine .......................... 100/494
5,343,265   8/1994  Oi et al. .
5,389,983   2/1995  Tsunefuji .
5,518,329   5/1996  Beaudry .............................. 400/621

*Primary Examiner*—David M. Gray
*Attorney, Agent, or Firm*—Young & Thompson

[57] ABSTRACT

A photo film cassette has a cassette shell which contains a roll of photo film. The cassette is adapted to plural different types of lens-fitted photo film units, and is pre-contained in a selected one of the types to be used. Indicia common to the various types are printed on the cassette shell before assembly of the cassette shell. Additional indicia are printed on the cassette shell after printing the common indicia and before being inserted in the lens-fitted photo film unit, and represent information peculiar to the selected type of the lens-fitted photo film units to be loaded.

2 Claims, 7 Drawing Sheets

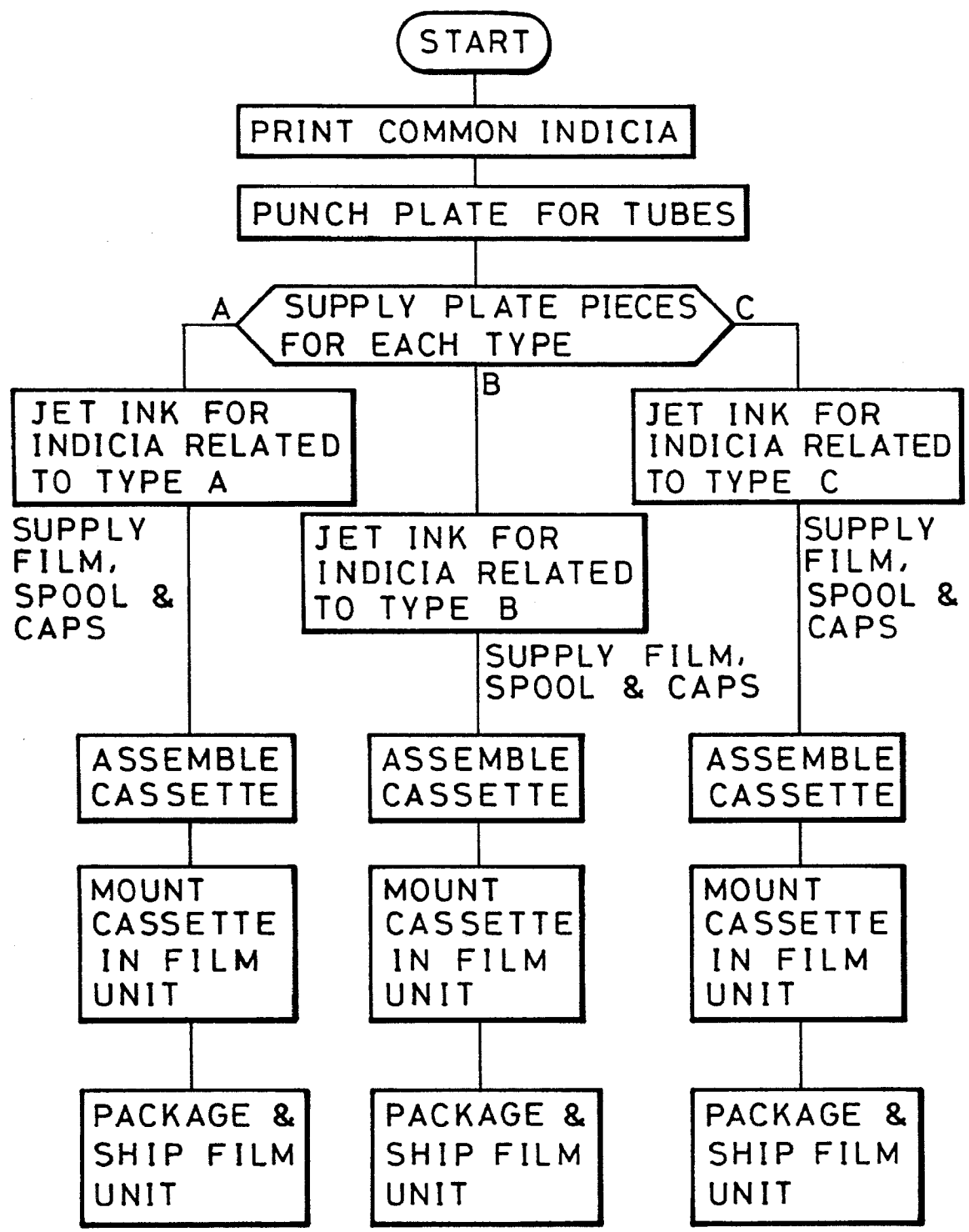

PHOTO FILM CASSETTE FOR LENS-FITTED PHOTO FILM UNIT AND CASSETTE MARKING METHOD

BACKGROUND OF THE INVENTION

1. Field of the Invention

The present invention relates to a photo film cassette for a lens-fitted photo film unit and a method of marking a photo film cassette. More particularly, the present invention relates to a film cassette provided with indicia convenient for use with various types of lens-fitted photo film unit.

2. Description Related to the Prior Art

There is a known lens-fitted photo film unit sold under a trade name of "Fujicolor Quick Snap" (manufactured by Fuji Photo Film Co., Ltd.), in which a film housing is pre-loaded with unexposed 135 photo film and provided with a simple mechanism for photography. To mount the photo film in the lens-fitted film unit, a film cassette of a widely used 135 type is incorporated in association with it. During assembly of the lens-fitted photo film unit, the photo film, pre-contained in the cassette, is pulled out of the cassette and formed in a shape of a roll. The cassette is inserted in a cassette containing chamber at the same time as the roll of the film is inserted in a film supply chamber.

When the film is wound for use of the lens-fitted photo film unit, a spool inside the cassette is rotated to wind the film after exposure into the cassette. When the film is fully exposed, the whole of the lens-fitted photo film unit is forwarded to a photo laboratory via a photofinishing agent. In the photo laboratory, the cassette with the exposed film is removed from the film housing. The film is developed, and subjected to printing to obtain photo prints. The photofinisher returns the film to the customer, and provides him with the prints.

In the film cassette, a spool is contained rotatably and has a roll of photo film wound on the spool. A cassette shell consists of a metal tube formed from a piece of plate and a pair of caps fitted on respective ends of the tube. A surface of the tube is provided with printed decorative patterns and letters including: the manufacturer's name, the maximum photographable number of exposures on the film, a trade name of the product, and film sensitivity according to the International Organization of Standard (ISO). Those are printed on the tube by means of printing plates, whether the cassette is to be sold independently or used in a photo film unit.

However, the printing operation by use of printing plates requires the preparation of plates, pretreatment wherein plate surfaces are coated with a white ground layer consisting of a specialized solvent, a post-treatment wherein portions printed with ink are dried by a dryer. Those steps result in a high cost for the printing although they can record printed images in high quality.

Nowadays there are plural variants of lens-fitted photo film units for purposes of photography in various manners. A model known as "Fujicolor Quick Snap +3" (trade name; manufactured by Fuji Photo Film Co., Ltd.) is capable of effecting 27 exposures on the film having a length standardized for 24 exposures, as the film is positioned with high precision when pre-loading the photo film unit with the film. There is another type of photo film unit in which a pair of opaque movable plates for shielding light are arranged in front of an exposure aperture and associated with a photographic light path, to change over the frame size between the 35 mm full size and a panoramic size 36×13 mm in which the full size is narrowed.

When the film is exposed in the panorama-changeable type, the film is provided with a mixture of full-size frames and panoramic frames. If a photofinisher does not know the mixture of the two frame sizes before the development, the development can be impeded. However the printing of indicia of the mixture information on the film cassette is disadvantageous if by use of printing plates, which must be prepared relative to each of the various types. The number of such printing plates thus required is excessively great. Lines and processes for printing on the film cassette are likely to raise expenses. Another drawback lies in low speed in the printing processes.

SUMMARY OF THE INVENTION

In view of the foregoing problems, an object of the present invention is to provide a photo film cassette having indicia convenient when incorporated into any of plural types of lens-fitted photo film units.

Another object of the present invention is to provide a photo film cassette on which indicia can be printed at a low cost.

In order to achieve the above and other objects and advantages of this invention, common indicia are printed on the cassette shell before assembly of the cassette shell, for representing information common to the plural types. Additional indicia are printed on the cassette shell after printing the common indicia and before insertion into the lens-fitted photo film unit, for representing information related to the selected type of the lens-fitted photo film units to be loaded.

In a preferred embodiment, the common indicia are printed by a printing plate. The additional indicia are printed by jetting ink onto the cassette shell.

In the present invention, the indicia are conveniently incorporated into any of plural types of lens-fitted photo film units. The indicia can be printed at a low cost.

Although photo film cassettes individually sold are directly seen by users, cassettes used with lens-fitted photo film units are not visible directly to their users. The former should be provided with printed indicia of a high quality. However, printing on the latter does not require high quality, and can have the simply printed additional indicia at a low cost.

BRIEF DESCRIPTION OF THE DRAWINGS

The above objects and advantages of the present invention will become more apparent from the following detailed description when read in connection with the accompanying drawings, in which:

FIG. 2 is a flow chart illustrating a cassette marking method of the present invention;

DETAILED DESCRIPTION OF THE PREFERRED EMBODIMENTS OF THE PRESENT INVENTION

Figure 1:
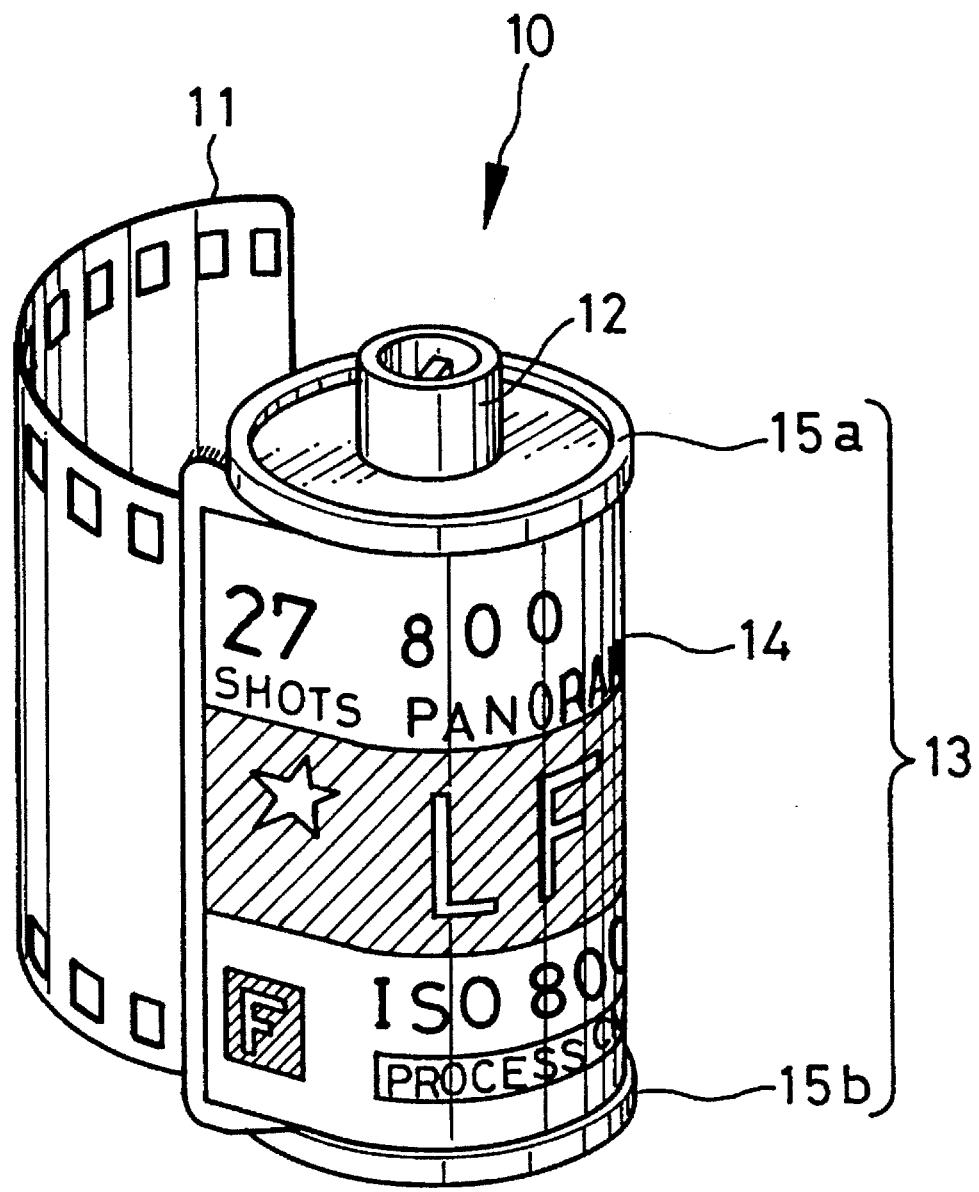
FIG. 1 is a perspective view illustrating a photo film cassette.

In FIG. 1, a photo film cassette 10 is illustrated, and consists of photo film 11, a spool 12 on which the film 11 is wound as a roll, and a cassette shell 13 containing the film 11 and the spool 12. The cassette shell 13 is constituted of a tube 14 and two caps 15a and 15b fitted on the tube 14.

Figure 1A:
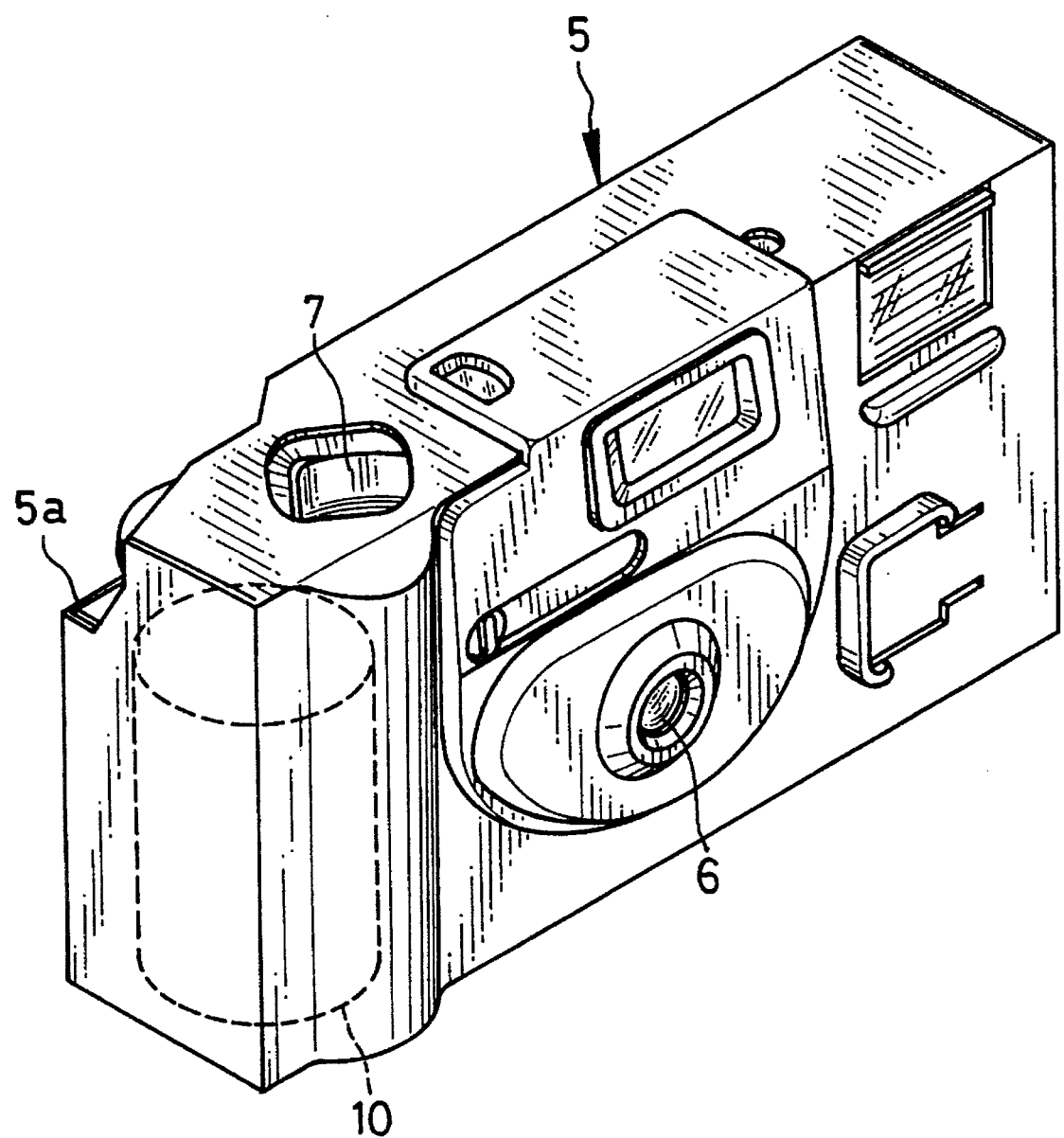
FIG. 1A is a perspective view illustrating a lens-fitted photo film unit pre-containing the cassette of FIG. 1.

FIG. 1A illustrates a lens-fitted photo film unit 5, which has a taking lens 6 and a shutter device 7, and precontains the film cassette 10. The lens-fitted photo film unit 5 consists of a film housing containing the film cassette 10 and a cardboard wrapper 5a which packages the film housing. There are various printed letters and indicia (not shown) with a decorative pattern outside the cardboard wrapper 5a for showing information related to the lens-fitted photo film unit 5 as a product.

The tube 14 of the cassette 10 consists of a rectangular metal plate bent into tubular shape. The outside of the tube 14 is provided with printed letters, numbers and marks: "27 SHOTS" as a maximum photographable number of exposures on the film 11, "800 PANORAMIC" as a trade name of the product, a star mark as a trademark of the manufacturer of the product, "LF" when used in a lens-fitted photo film unit, "F" for a frame number system, "ISO 800" as film sensitivity according to the Standards Organization (ISO), and "PROCESS CN-16/C-41" as a process of development of the film according to the recommendation of the manufacturer.

Note that the term "frame number system" is a system in which the rear of each photograph as finished is provided with a frame number coinciding with the frame number formed on the negative film edgewise with the corresponding frame. It is necessary for a photofinisher to identify the manufacturer, because the nature of the photo film depends on its manufacturer, and when printing must be known for correct printing. The star mark for the trademark is used herein for the purpose of illustrating the position of printing the trademark, and actually is replaced with a particular trademark used by the film manufacturer. The process of the film development herein referred to consists of combinations of uses of treating solutions and chemicals, with treating steps following predetermined parameters.

Figure 3A:
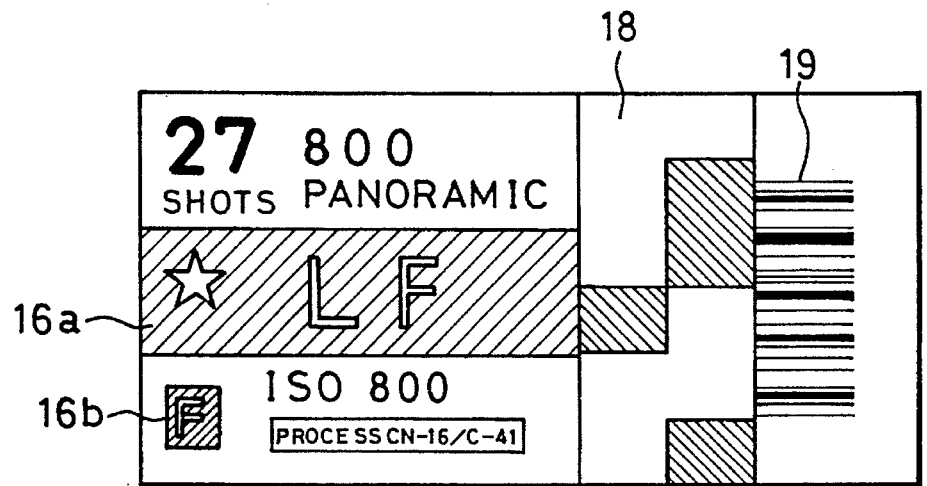
FIG. 3A to 3C are exploded views illustrating tubes of each film cassette of the present invention.
Figure 3B:
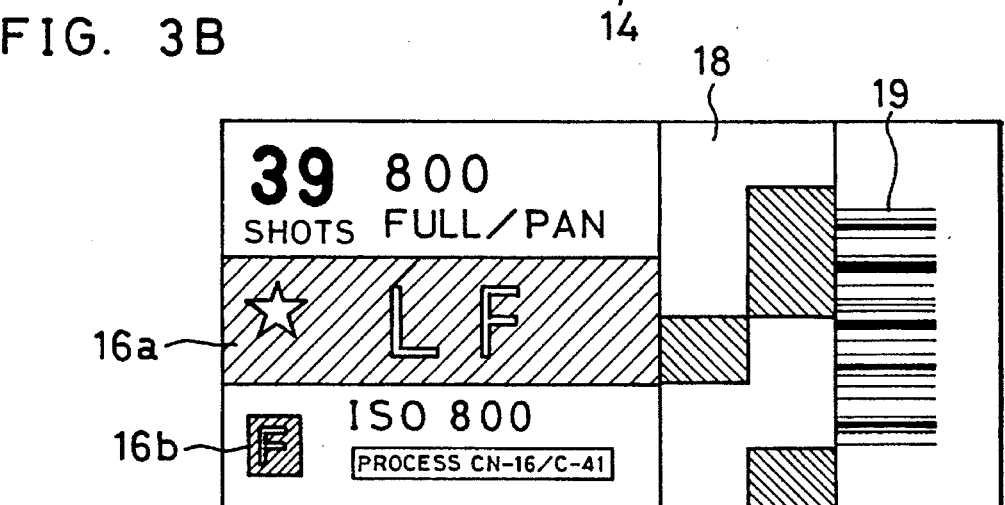
Figure 3C:
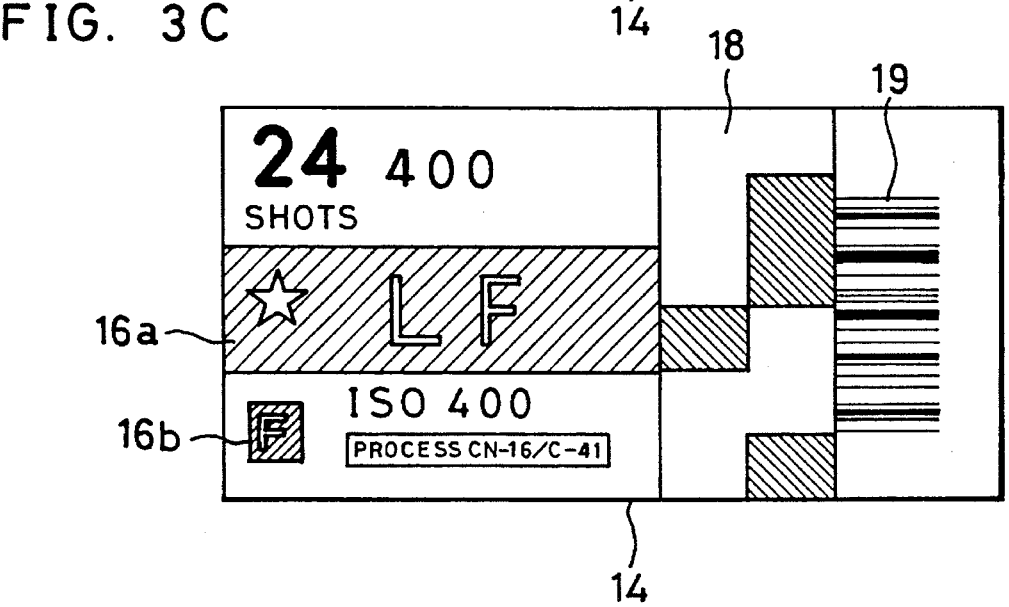

In FIG. 2, the common indicia for 100 cassettes are printed on a single flat metal plate. The common indicia are information common to plural different types of the photo film 11 to be contained in the cassette 13. As illustrated in FIGS. 3A to 3C, the common indicia are "LF", "F" and a star mark, which are printed in hatched areas 16a and 16b in the drawings, by use of printing plates. The hatched areas 16a and 16b represents colored portions, which may be green. The common indicia "LF", "F" and the star mark are formed to be blank without the green color, in the colored portions in planar fashion. A DX code 18 and a bar code 19 are printed together in the same manner as the common indicia.

The DX code 18 and the bar code 19 depend on the nature of the film 11, and are readable by a camera automatically to input information of film sensitivity, the maximum photographable number of exposures on the film 11, and film latitude. The DX code 18 and the bar code 19 are printed also with the printing plates, because they require durability of being read automatically by reader devices and enough intensity and clarity.

The metal plate material is punched to obtain plate pieces, which are distributed for Types A, B and C. Then an ink-jet printer is used for printing additional indicia, inclusive of patterns and letters, on to Types A to C. The additional indicia are particular to each of Types A to C, and can include "27 SHOTS", "800 PANORAMIC", "ISO 800" and "PROCESS CN-16/C-41".

Type A as illustrated in FIG. 3A is constructed simply for panoramic photography. An ink-jet printer is operated to print the maximum number "27 SHOTS" and a trade name "800 PANORAMA" on Type A. Type B as illustrated in FIG. 3B is changeable between panoramic photography and standard photography at 35 mm full size. The ink-jet printer prints the maximum number "39 SHOTS" and a trade name "800 FULL/PAN" on Type B. Type C as illustrated in FIG. 3C is constructed for standard photography at 35 mm full size. The ink-jet printer prints the maximum number "15 SHOTS" and a trade name "400 FULL-SIZE" on Type C of which the film sensitivity is ISO 400. Those being so, it is expected that no mistake will occur during assembly of the lens-fitted photo film units and the film development. Note that the letters of the type-related indicia are printed on a white ink layer, which has been previously formed as a ground by the first printing operation with the printing plates. It is however possible to eliminate the white ink layer and for the ink-jet printer to print the indicia directly on a bare metal surface of the tube 14.

It is also to be noted that a lens-fitted photo film unit with the film of ISO 400 has a different shutter device from the shutter device 7 associated with the film 11 of ISO 800 pre-contained in the lens-fitted photo film unit 5 to adapt the shutter speed to the sensitivity.

The plate after printing is bent into a tubular shape, to form the tube 14. The film 11, the spool 12 and the caps 15 and 16 are supplied and assembled into the film cassette 10.

After the assembly, the film cassette 10 of each type is handled in an assembly line, and inserted in the lens-fitted photo film unit, which is then packaged and shipped.

Figure 4:
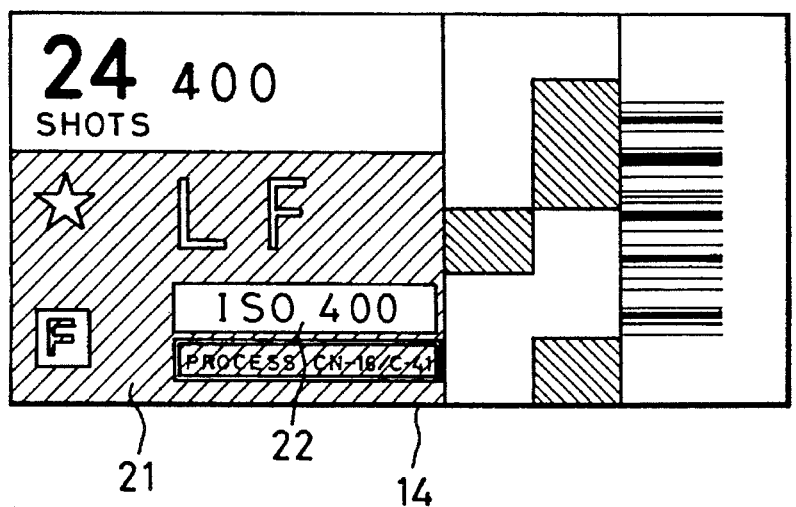
FIG. 4 is an exploded view illustrating a tube another cassette, on which all of common indicia appear as blank portions in a green ground.

FIG. 4 illustrates another preferred film cassette, around which areas for additional indicia are clarified. A metal plate for the cassette is previously provided with the indicia "LF", the star mark, the indicia "F" and "PROCESS CN-16/C-41" by the use of printing plates, in a form wherein a hatched area 21 is colored green in planar fashion except for the indicia left blank without green color. A rectangular area 22 for "ISO 400" is also left blank. Later the additional indicia "24 SHOTS", "400" and "ISO 400" are provided by an ink-jet printer.

Figure 5:
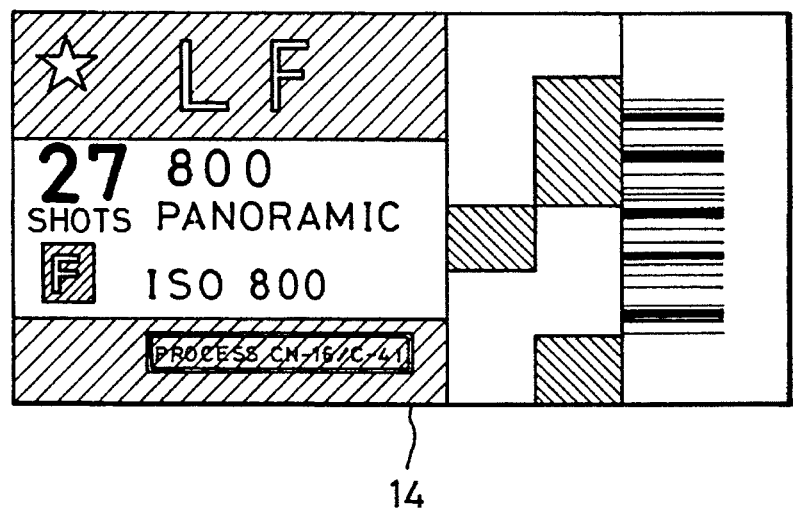
FIGS. 5 and 6 are exploded views illustrating tubes of other cassettes, on which additional indicia are located in the middle of the cassettes.
Figure 6:
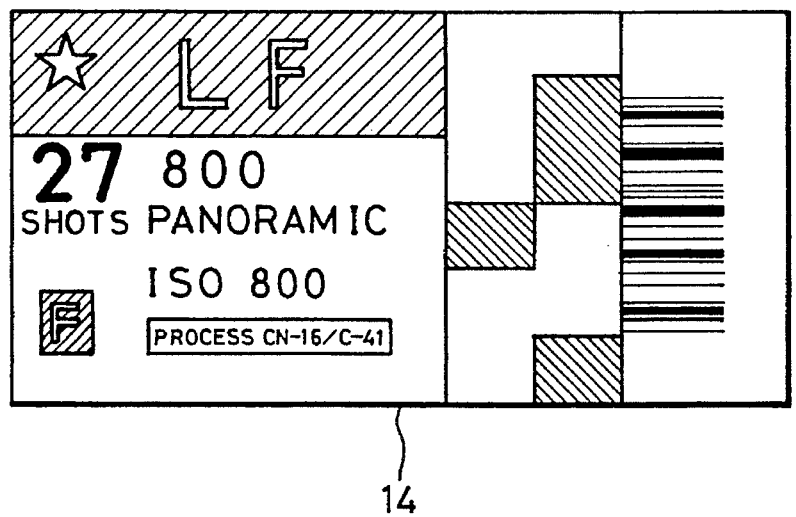

FIGS. 5 and 6 illustrate other preferred film cassettes, of which the indicia "LF" and the star mark are arranged near the top. A metal plate for the cassette of FIG. 5 is previously provided with "LF", the star mark, the indicia "F" and "PROCESS CN-16/C-41" by use of printing plates. Later the additional indicia "27 SHOTS", "800 PANORAMIC" and "ISO 800" are provided by an ink-jet printer. A metal plate material for the cassette of FIG. 6 is previously provided with "LF", "F" and the star mark by use of printing plates. Later the additional indicia "27 SHOTS", "800

PANORAMIC", "ISO 800" and "PROCESS CN-16/C-41" are provided by an ink-jet printer.

Figure 7A:
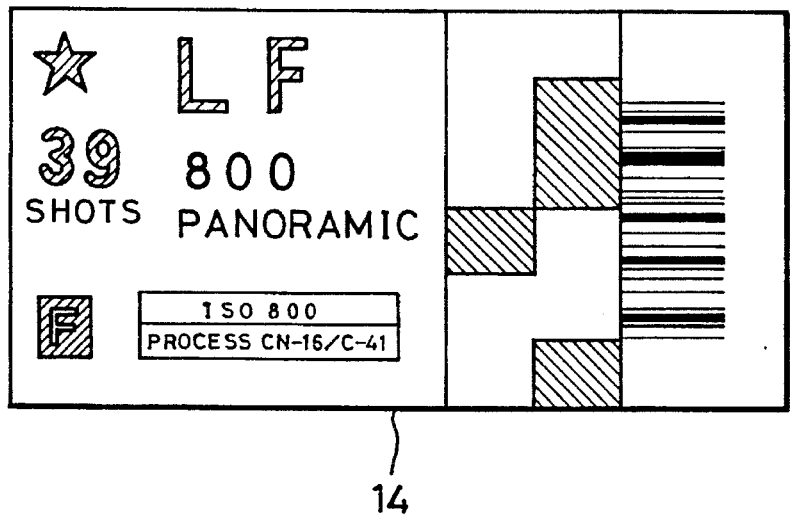
FIGS. 7A to 7C are exploded views illustrating tubes of other cassettes, on which additional indicia are limited to a name of the product.
Figure 7B:
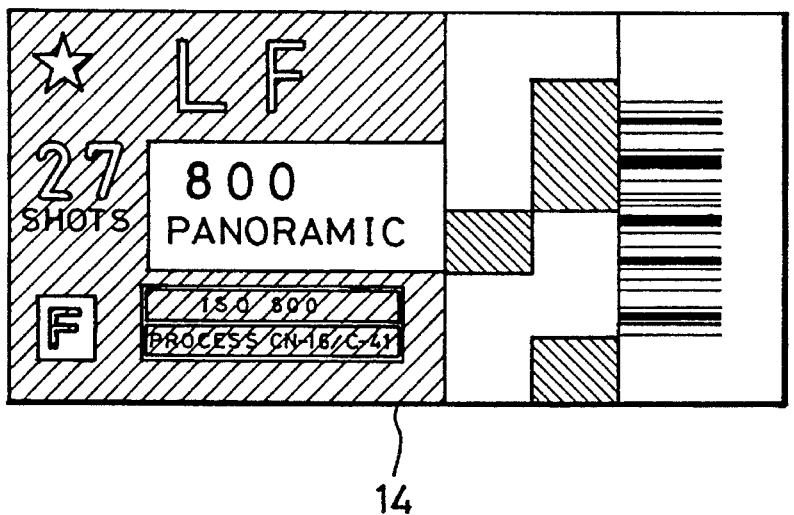
Figure 7C:
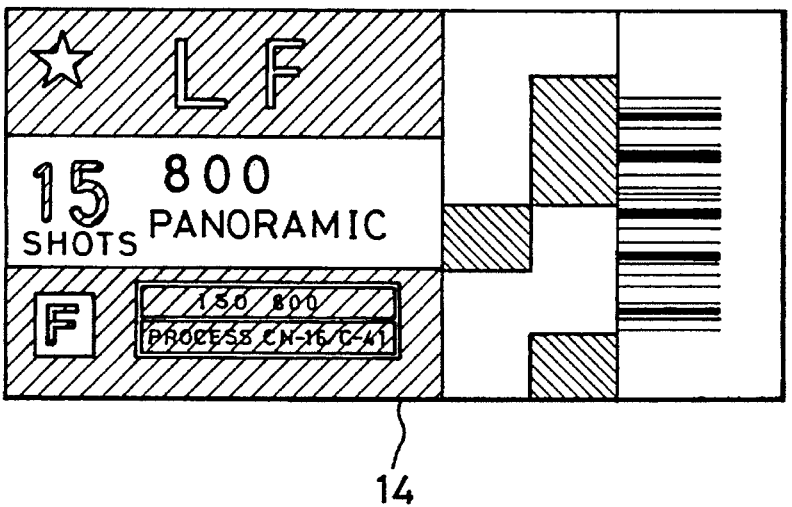
Figure 8A:
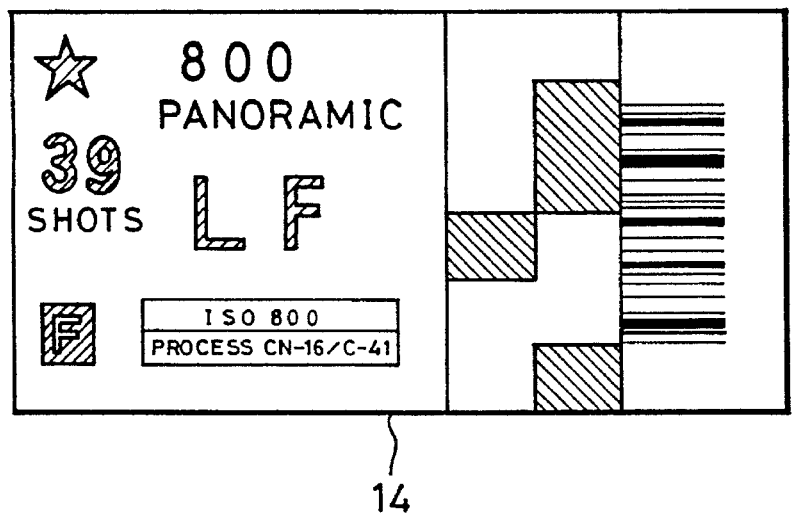
FIGS. 8A to 8C are exploded views illustrating tubes of other cassettes similar to FIGS. 7A to 7C, but on which additional indicia are located at the top of the cassettes.
Figure 8B:
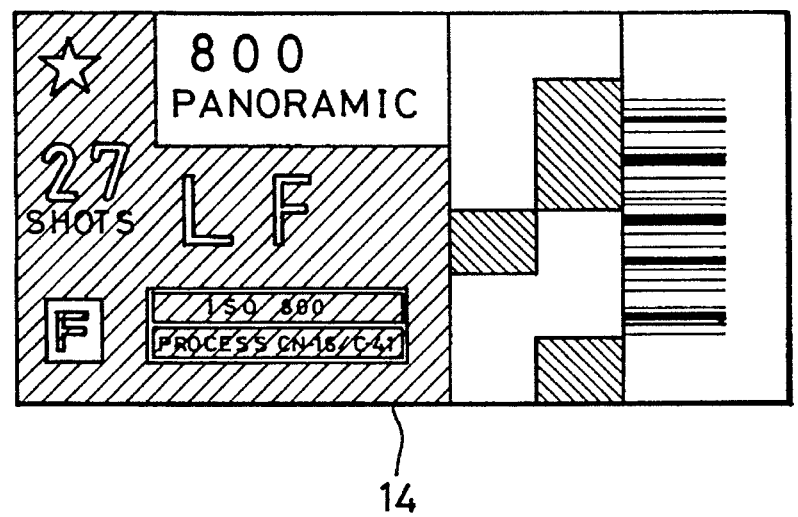
Figure 8C:
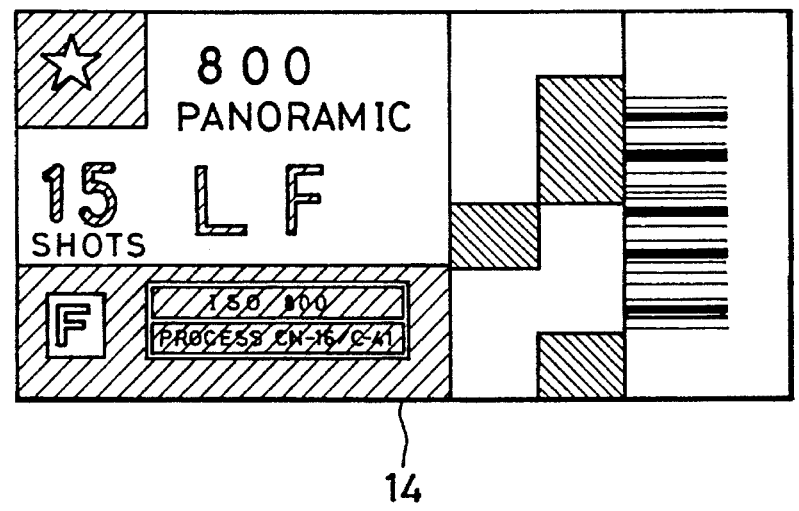

FIGS. 7A to 8C illustrate other preferred film cassettes, of which only "800 PANORAMIC" as product name constitutes additional indicia, for clarifying the maximum photographable number of exposures. Only "800 PANORAMIC" is printed with jetted ink. In FIG. 7A, nearly all the indicia are printed on the blank ground. In FIG. 7B, "800 PANORAMIC" is printed on the blank ground after a surrounding area is printed in green with a printing plate. In FIG. 7C, "15 SHOTS" and "800 PANORAMIC" are printed on the blank ground after top and bottom areas are printed in green. The embodiments of FIGS. 8A to 8C have the star mark and "800 PANORAMIC" arranged in the top, and are similar to those of the FIGS. 7A to 7C.

In the above embodiments, the additional indicia are printed by the ink-jet printer. It is alternatively possible to print the additional indicia by use of any other printer, such as a thermal transfer printer. In the above, the common indicia are printed while the metal plate material for the tube 14 is flat before being bent into a tube. Instead the common indicia may be printed after the metal plate piece is bent into tube 14 or after the cassette has been assembled completely. In such a manner of printing, the tube 14 or the cassette 10 can be rotated with reference to a stationary printing head of the ink-jet printer or other printer. Otherwise the tube 14 or the cassette 10 can be supported stationarily during application of a recording head revolving thereabout.

In the above, the additional indicia are printed in black and in a higher density. A preferable color for the additional indicia can be dark blue instead of black. Either of them has the advantage of easy recognition. The common indicia above is printed in green and in a lower density. However any colors may be used for the common and additional indicia. Two colors can have different hues at equal density, such as yellow and light blue, and can have different density equal hue, such as black and gray.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A method of marking photo film cassettes, which are adapted to plural different types of lens-fitted photo film units, and are pre-contained in selected ones of said types to be used, comprising the steps of:

printing common indicia on plate material supplied for constituting a plurality of said film cassettes before assembly of said film cassettes, said common indicia representing information common to said plural types;

cutting said plate material into separate pieces after printing said common indicia;

distributing said separate pieces into groups for separately printing thereon additional different indicia individual to respective ones of said selected types; and printing an additional indicium on said separate pieces after printing said common indicia and before inserting said film cassette in said lens-fitted photo film unit, for representing information related to said selected type of said lens-fitted photo film units to be loaded with said cassettes, said additional indicium being the same for all pieces in one said group and different from the indicia of the other said groups.

2. A cassette marking method as defined in claim 1, wherein said common indicia are printed by a printing plate, and said additional indicia are printed by jetting ink onto said separate pieces.

* * * * *